July 19, 1960 H. BLACKSTONE 2,945,414

OPTICAL SCANNING DEVICE

Filed March 16, 1956 2 Sheets-Sheet 1

INVENTOR
HENRY BLACKSTONE
BY Mitchell & Bechert
ATTORNEYS

July 19, 1960 H. BLACKSTONE 2,945,414
OPTICAL SCANNING DEVICE
Filed March 16, 1956 2 Sheets-Sheet 2
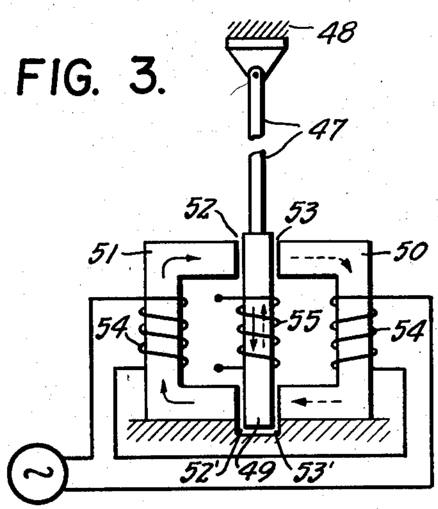
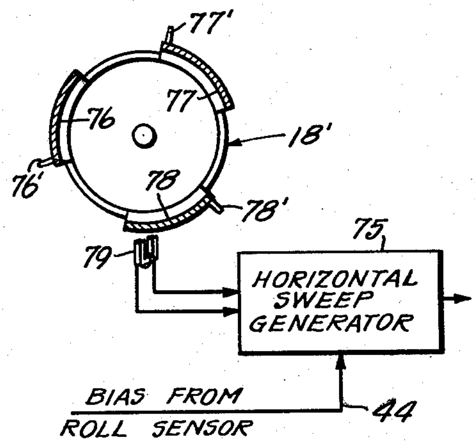
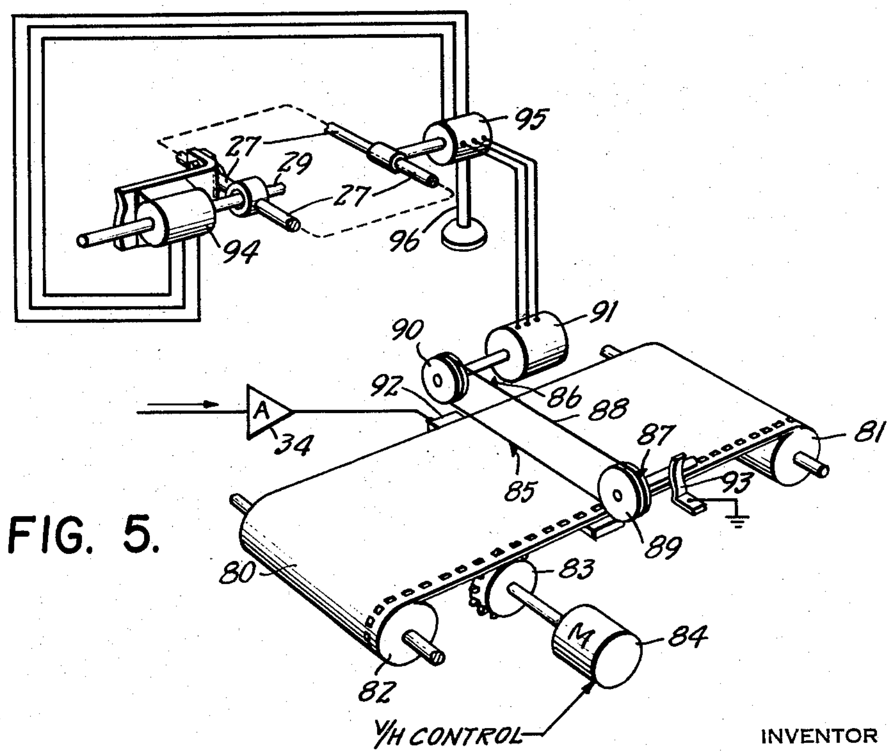
INVENTOR
HENRY BLACKSTONE
BY
Mitchell & Bechert
ATTORNEYS United States Patent Office 2,945,414

Patented July 19, 1960

2,945,414

OPTICAL SCANNING DEVICE

Henry Blackstone, Northport, N.Y., assignor to Servo Corporation of America, New Hyde Park, N.Y., a corporation of New York Filed Mar. 16, 1956, Ser. No. 572,079

16 Claims. (Cl. 88—1)

My invention relates to optical scanning and display devices of the general character disclosed in copending patent application Serial No. 320,272, filed November 13, 1952, in the name of Henry Blackstone et al.

In scanning devices of the character indicated, it has been the practice either to mount the scanner directly in the frame of the carrying aircraft, or to employ an independently stabilized platform or mount to support the scanner with reference to the aircraft frame. While such a mount can be adequate for the purpose, it is unnecessarily bulky and complex, in that it performs more functions than are needed for the purpose of developing an adequately stabilized ultimate record or display; for example, the operation of such a stabilized mount involves the employment of one or more gyros independent of the scanner, and serving to establish a proper frame reference or orientation for operation of the scanner. Quite aside from the above-noted complexities, it has been desirable, for economic reasons, to employ a standardized stabilized mount, so that unnecessary dimension limitations have been imposed on scanner design by reason of the standardized dimensions of the available stabilization mounts.

It is, accordingly, an object of the invention to provide an improved scanner and associated display not subject to the above-noted limitations.

It is a further object to provide an improved scanner and display in which the scanner itself may constitute the principal gyroscopic element and may thus serve a self-stabilizing function.

It is a specific object to provide an improved scanner of the character indicated, wherein no independent stabilization mount is required in order to achieve a fully stabilized and properly integrated display, regardless of transient fluctuations in aircraft orientation in the course of operation of the scanner.

It is another specific object to provide a device meeting the above objects and equally adaptable to transient display, as in the case of a cathode-ray tube, and to permanent recording, as on a continuously moving strip of suitably sensitized material.

Other objects and various further features of novelty and invention will become apparent or will occur to those skilled in the art from a reading of the following specification in conjunction with the accompanying drawings. In said drawings, which show, for illustrative purposes only, preferred forms of the invention:

Fig. 3 is an enlarged fragmentary detail view, schematically indicating internal mechanism for one of the elements of Fig. 2;

Fig. 4 is a fragmentary diagrammatic view of alternative components for a portion of the system of Fig. 2; and Fig. 5 is a view similar to Fig. 4 to illustrate a still further alternative.

Briefly stated, my invention contemplates a self-stabilized scanner of the character indicated, wherein the scanner is constructed of such relatively high polar moment of inertia that it may constitute the gyroscope of an inherently self-stabilized system. The scanner may be supported on a two-axis gimbal suspension, including means for automatically compensating for normal precession induced by gyroscopic rotation of the scanner. In the forms to be described, scanning action is generally laterally of the vertical plane which includes the axis of scanner rotation, and means responsive to the instantaneous tilt orientation of the gimbal in which the scanner is rotated is so connected to the sweep mechanism for the display that proper integration of successive display sweeps in the display is automatically effected. The systems to be described incorporate other features for automatic accommodation to the instantaneous velocity-altitude (V/H) function of the aircraft, and for automatic heading correction, as to accommodate a direction reference, a drift setting, or adaptation to a directional gyro or the like.

Figure 1:
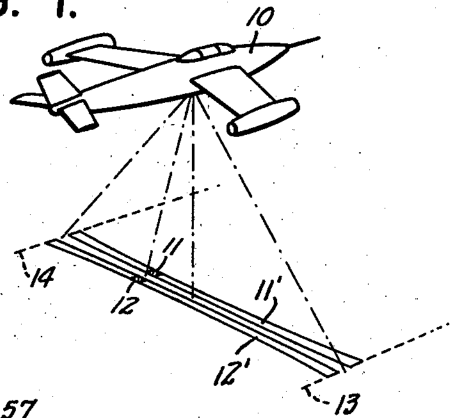
Fig. 1 is a simplified view in perspective, indicating scanning functions in terms of aircraft orientaton and flight direction.

Referring to Fig. 1 of the drawings, my invention is shown in application to a scanner of the type which may be carried by a reconnaissance or the like aircraft 10, having moving optical elements for periodically causing the image or images 11—12 of energy-responsive means to traverse one or more scan lines 11′—12′ beneath the aircraft, as between the lateral limits 13—14. Traversal of more than one line for each scan will be understood as suggestive of frame-sequential scanning action, even though the language herein may refer to several spaced elements scanning a line.

The scanner may be one of various types, but for simplicity of description in the present connection, I have chosen to illustrate the invention as applied to a scanner of the general type described in the above-identified copending application. Such a scanner may include energy-responsive means, such as a cell 15, having one or more energy-responsive elements, and since, in the form shown, two elements are used to develop the ground images 11—12, two separate video outputs 16—17 are available from the cell 15.

The cell 15 may be at the center of rotation of a scanner drum 18 on which are mounted a plurality of like optical elements 19—20—21 which may be mirrors of equal angular width and spaced from each other by amounts equal to their width, but which, in the form shown, are lenses spaced equally about the drum 18. The scanner 18 may be continuously driven, as by a servomotor 22, and a tachometer 22′ may provide stabilizing feed back to the associated servoamplifier 22″. To avoid spurious responses, shielding means 23 are shown schematically to embrace the entire scanning structure except for a window or opening between limits 24—25. Shield 23 assures that incoming energy may pass through only one of the lenses 19—20—21 at a time, for focusing on the cell 15.

For system response to scanned lines 11′—12′ in the visible spectrum, the elements of cell 15 may be ordinary photocells, in which case, of course, the lenses 19—20—21 may be ordinary optical glass such as that known as Pyrex. For response in the infrared, however, the elements of cell 15 should be appropriate to the response region and, in the far-infrared, thermistor elements are satisfactory; in the latter event, the glass of lenses 19—20—21 should be appropriate to the cell-element response, and arsenic-trisulfide glass is satisfactory.

In accordance with the invention, I utilize the scanner drum 18 as a gyroscope and therefore as the prime stabilizing mechanism for maintaining orientation of the scanner during any given flight, irrespective of instantaneous fluctuations in flight orientation during a particular scanning run. For this purpose, the scanner assembly is hung from a two-axis gimbal suspension employing a yaw gimbal or ring 26 and a pitch gimbal or ring 27. As far as the scanner proper is concerned, the pitch gimbal 27 is the frame within which the scanner drum 18 is journalled for rotation, and the cell 15 is secured to the frame 27 by means of a suitable standard 28. Since the scanner is shown (in Fig. 1) oriented for scanning lines 11′—12′ generally laterally of the flight path, the axis or shaft 29 for scanner rotation is oriented generally in the flight direction. Thus, any roll of the aircraft will develop a slight phase error in the video output of the cell 15. As will be explained more fully below, I provide suitable means 30 carried by the frame or pitch gimbal 27 for continuously sensing roll orientation, as with respect to the vertical, for use in automatically shifting the phase of the video signals so as to provide correct integration in the ultimate display.

For the form shown, the display means includes a cathode-ray tube 31, intensity-modulated at 32 in accordance with the video output of cell 15. Because the multiple elements of the cell 15 provide multiple outputs in lines 16—17, I provide for high-speed commutation at 33 between the independently amplified outputs of these channels. The commutated video is then suitably amplified at 34 for supply to the intensity-modulation connection 32′, and, by employment of a suitable step-function generator 35, synchronized with action of switch 33 for control of vertical deflection at 36, there may be developed on the face of tube 31 a plurality of separately displayed lines 37—38, appropriate to the number of elements in cell 15 (and to the corresponding number of lines 11′—12′ per scan). Optics 40 may continuously image the scan-line development 37—38 on the recorder film 40′, which in turn may be continuously driven by motor means 41, in accordance with the instantaneous velocity-altitude function (V/H rate) of the aircraft, as available from a V/H meter 42. A suitable V/H meter is described in greater detail in my copending application, Serial No. 480,254, filed January 6, 1935, now U.S. Patent No. 2,878,712.

For the arrangement shown, the horizontal sweep signals for supply to connection 39 are developed from a linear potentiometer 43, directly following scanner rotation. Since there are shown to be three optical elements 19—20—21 on the scanner, there will be three scan lines per rotation of the scanner, and thus the potentiometer 43 will be understood to develop three successive horizontal sweep voltages per scanner revolution. In order to correct for the phase error induced by reason of transient roll of the aircraft, the roll-sensing device 30 develops in line 44 a sweep-biasing signal, which may be summed at 45 with the output of potentiometer 43, for supply to the horizontal-deflection connection 39.

The roll-sensing device 30 may be one of a variety of forms, and in Fig. 3, I illustrate one suitable embodiment comprising essentially a pendulum 47 suspended from the frame 48 of the device 30 and therefore also suspended with respect to the frame or pitch gimbal 27. The lower end of the pendulum is shown to comprise an armature member 49, cooperating with two fixed magnetic-core members 50—51 also carried by the frame of the device 30. The arrangement is such that any tilt of the pitch gimbal from the horizontal and about the scan-rotation axis 29 will be accompanied by an opening of the gaps 52—52′ and a closing of the gaps 53—53′ on the one hand, and by an opening of the gaps 53—53′ and closing of the gaps 52—52′ on the other hand.

Figure 2:
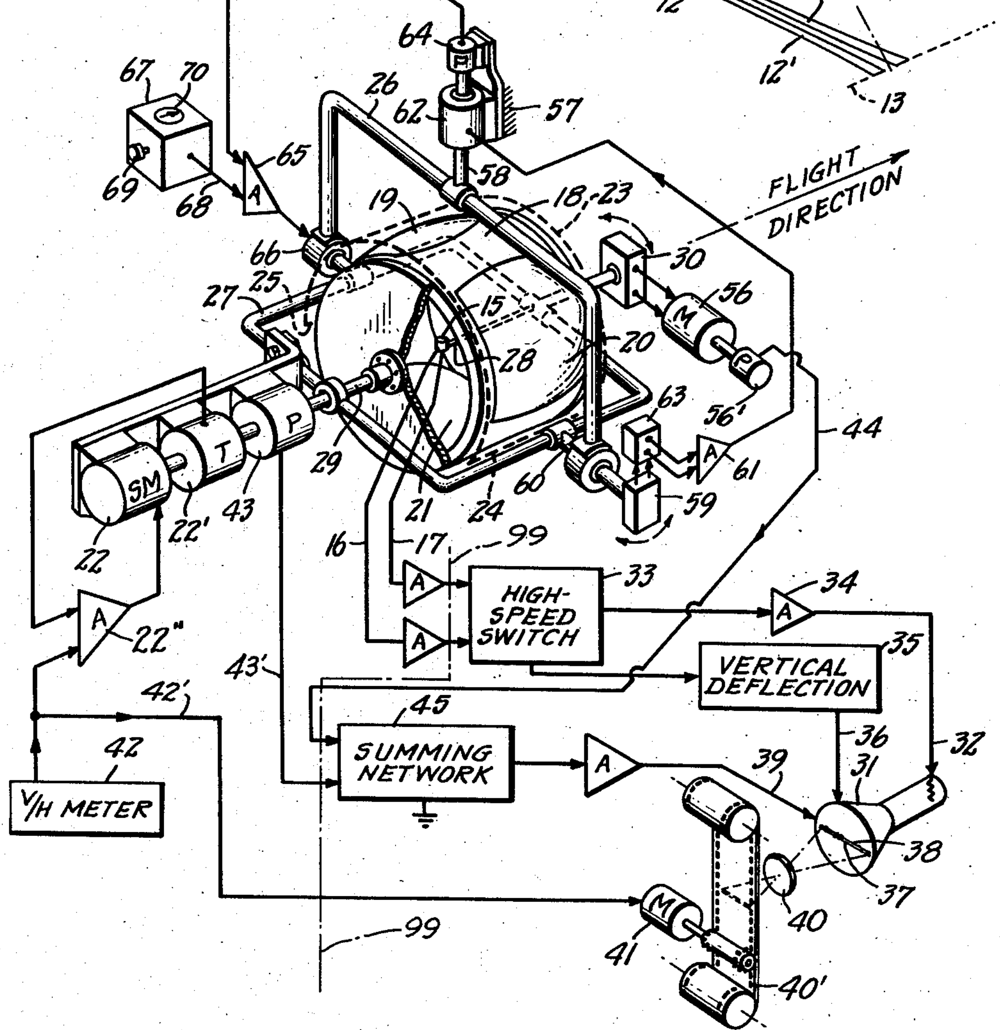
Fig. 2 is a diagrammatic view in perspective, schematically indicating optical, mechanical and electrical components of a scanner and associated display, incorporating features of the invention, and as carried by the aircraft of Fig. 1.

Separate excitation windings 54 are connected in series to an A.-C. source and in a sense to establish flux circulation in the same sense (e.g. clockwise) in the path determined by members 51—49, on the one hand, and in the path determined by members 49—50, on the other hand. Such relationship of flux circulation is indicated by solid arrows for the left side of the system and by broken arrows for the right side of the system, and it will be noted that for a perfectly oriented system in which all gaps are equal, the two flux circulations in the armature 49 are equal and opposite. Under such balanced or properly oriented conditions, a pick-off winding 55 linked to the armature 49 will develop no output signal. However, the phase of any output signal developed in winding 55 will directly reflect the sense of tilt of element 30, and the amplitude of such signal will reflect the amplitude of tilt. The output signal from winding 55 is shown (in Fig. 2) driving a suitably responsive split-phase motor 56 and potentiometer 56′, for developing in line 44 a corrective signal proportional to the direction and amplitude of tilt about the roll axis (i.e. about the scanning axis).

To complete the description of the system, the frame or pitch gimbal 27 is suspended from the yaw gimbal 26 on an axis generally in the horizontal plane and transverse to the scanning axis. Finally, the whole system is rotatable with respect to the frame 57 of the aircraft on an axis or shaft 58 normal to the flight plane of the aircraft.

To correct for normal precession of the gyroscope or scanner 18, I show a pitch-sensing device 59 referenced to the pitch gimbal or frame 27 for sensing rotation thereof about the axis or shaft 60 (pitch axis). The output signal from the pitch sensor 59 may be suitably processed at 61 for application to a torquer 62, so that the torquer 62 may apply to the yaw gimbal 26 corrective torque about the yaw axis 58, in order to offset any tendencies to pitch, as detected at 59. In the form shown, the device 63 interposed between the pitch-sensing mechanism 59 and the amplifier 61 is purely for protection purposes and may be, for example, a so-called accelerometer erection cut-out device, whereby response to too-sudden pitch transients can be reduced. To stabilize against precession about the pitch axis 60, I show a potentiometer 64 mounted on the yaw axis 58 and referenced to the aircraft frame 57 for developing a yaw-error signal, to be amplified at 65 for driving a second torquer 66 on the pitch axis.

If desired, a remote-control device 67 may be employed for establishing directional control of the system. The device 67 will thus be understood to be a direction reference, or a remote compass, or a directional gyro or the like, and for present purposes, it suffices merely to describe the device 67 as a means for determining say, a drift-correction setting or bias in the line 68 to amplifier 65. A manual control 69 and visual display 70 are shown to facilitate such setting.

In the arrangement of Fig. 4, I show a slight modification of the invention, whereby the gyroscopic scanner 18′ serves to operate an electronic sweep for the display means 31. Thus, the sweep signal may be developed by a horizontal sweep generator 75, for which synchronizing signals are available by direct pick-off from the scanner drum 18′. In the form shown, the drum 18′ happens to employ a plurality of mirrors 76—77—78 in the manner described in said copending application Serial No. 320,272. Magnetic lugs, or rather, lugs of magnetic material 76′—77′—78′ are carried by the drum 18′ and project into flux-coupled relation with a stationary core or pick-up element 79 which may be fixedly mounted on the pitch gimbal or frame 27. The signals developed by electrical coupling to the core 79 will be understood to trigger successive saw-tooth sweeps of the generator 75. In order to a correct for video-signal phase errors occasioned by roll of the aircraft, the biasing signal available in line 44 from the roll sensor 30 may be applied to bias the instantaneous output level of the generator 75. Operation will otherwise be as described for Fig. 2.

In the arrangement of Fig. 5, I show application of my invention to what may be termed a printing-type display wherein a permanent record is continuously and instantaneously available for interpretation. The display device may thus comprise a continuously moving strip 80 of suitably sensitized recorder paper or the like, available from a supply reel 81 and advanced on to a take-up reel 82. The advancing mechanism includes a feed sprocket 83 driven continuously by a motor 84 and, for purposes of preserving correct scale in the ultimate display, the motor 84 is shown driven in accordance with the V/H control, available as from the means 42 of Fig. 2. Scanning action across the paper 80 is developed by styli 85—86—87 spaced equally on a continuous strip or belt 88 spanning pulleys 89—90 and continuously driven by motor means 91. For the form shown, the paper 80 is responsive to electrostatic charges developed across its thickness and therefore the styli 85—86—87 traverse the paper 80 above a platen 92; platen 92 is shown supplied by intensity-modulation video signals, as from the amplifier 34 described in connection with Fig. 2. After passing through paper 80 and one of the styli 85—86—87, these video signals may be grounded at 93.

Roll errors may be automatically corrected by driving the motor 91 in accordance with the differential output of means reflecting scanner-shaft rotation and means reflecting pitch-gimbal orientation (roll) about the scanner axis. In the form shown, synchros are employed for this purpose. Thus a synchro generator 94 replaces the potentiometer 43 on the scanner drive shaft 29, and a differential synchro 95 includes a frame oriented by a pendulum 96 to develop the tilt or roll correction needed. The electrical differential signal resulting from the indicated series-connection of the synchro 94 to synchro 95 establishes corrected electrical drive signals for the motor 91, as will be understood.

In operation, the pilot will of course attempt to fly a prescribed reconnaissance course, and, depending on the cross-wind, he will make proper adjustment at 69 so that yaw stabilization (sensed at 64) will always align successive scan lines truly transverse to the true path of the aircraft, regardless of heading or "crab." The scanner drum 18 will continuously rotate at a rate governed by the instantaneous V/H rate (available at 42) so that successive "frames" of scanned element lines 11'—12' may be properly spaced and scaled in the integrated display at 40' (or at 80). Instantaneous roll deviations are immediately sensed at 30, and appropriate correction is made in the instantaneous origin of the horizontal sweep on tube 31, or for the styli 85—86—87 across paper 80. Because of the gyroscope action of scanner 18, no roll stabilization is needed, and the scanner itself provides the means whereby pitch and yaw precession is automatically corrested.

The apparatus has been described as a complete system, to be airborne as a unit. In many cases, this is the most practical realization of the invention, as for example, in piloted reconnaissance aircraft. For other situations, including pilotless-aircraft (or guided-missile) reconnaissance, telemetering by radio link is important. In the latter situation, only scanner parts need be airborne, and a telemetering radio link may separate the scanner from a ground-based (or elsewhere airborne) display means. For such purposes, the system may be divided as suggested by phantom line 99 in Fig. 2, meaning that video signals (lines 16—17), synchronization and roll-correction signals (lines 43'—44), and V/H signals (line 42') may be telemetered as needed.

It will be seen that I have described an improved scanning and display device particularly adapted to aircraft reconnaissance of terrain. My device permits substantial simplification with respect to previous systems, and design for particular purposes is not in any way limited by the dimensions of standard stable platforms. Furthermore, since precession-corrective forces are all that need be developed, the power requirements previously necessary for a completely stabilized system are substantially reduced.

While I have described the invention in detail for the preferred forms shown, it will be understood that modifications may be made within the scope of the invention as defined in the claims which follow.

I claim:

1. Optical scanning and display means mounted on a body subject to roll about a roll axis comprising energy-responsive means, a scanner including an optical element imaging said energy-responsive means in a field of view, means for moving said optical element to cause the image of said energy-responsive means to scan a line in the field of view, said last-defined means including a rotatable support of relatively high polar moment of inertia journalled for rotation about a scan axis extending substantially in the direction of the roll axis, frame means supporting said scanner for rotation about said scan axis, video-display means responsive to the output of said energy-responsive means and including a sweep synchronized with scan rotation, and electrical means responsive to the orientation of said frame means about said scan axis and in biasing relation with said sweep, whereby, in the presence of roll of said frame means about said axis, successive lines detected by said scanner may be presented in properly correlated relation on said display means.

2. A mechanism according to claim 1, in which said video-display means includes a cathode-ray tube and said sweep traverses one of the deflection axes of said tube.

3. A mechanism according to claim 2, in which said sweep includes a sweep potentiometer connected to follow rotation of said scanner in reference to said frame.

4. A mechanism according to claim 2, in which said sweep includes a saw-tooth generator and cooperating elements carried by said frame and uniquely identifiable with a reference angular position on said scanner for developing a synchronizing pulse for synchronizing said sweep generator.

5. A mechanism according to claim 1, in which said display means includes a chart recorder comprising means for continuously advancing a strip of sensitive paper or the like along a path of advance, and means responsive to the video output of said energy-responsive means and traversing said path of advance for developing intensity-modulated lines across said paper or the like, said last-defined means being synchronized with scanner rotation.

6. Optical scanning means mounted on a body subject to motion about two mutually perpendicular axes, comprising two gimbal frames pivotally related on a first of said axes, means for pivotally mounting one of said frames to the body on the second of said axes, a scanner including a rotary optical member journalled in the other of said frames on a third axis perpendicular to both said first and second axes, said scanner including an energy-responsive element imaged by said optical member in a field of view, means for continuously rotating said optical member about said third axis, whereby said image is repeatedly swept in a scan line across said field, means responsive to instantaneous deviation of said other frame about said first axis and in precession-correcting relation with said one frame about said second axis, means responsive to instantaneous deviation of said one frame about said second axis and in precession-correcting relation with said other frame about said first axis, and directional-reference means in precession-correcting relation with said other frame about said first axis, whereby the video output of said energy-responsive element may reflect self-stabilized scanning by said scanner.

7. Optical scanning means mounted on a body subject to motion about two mutually perpendicular axes, comprising two gimbal frames pivotally related on a first of said axes, means for pivotally mounting one of said frames on the second of said axes, a scanner including a rotary optical member journalled in the other of said frames on a third axis perpendicular to both said first and second axes, said scanner including an energy-responsive element imaged by said optical member in a field of view, means for continuously rotating said optical member about said third axis, whereby said image is repeatedly swept in a scan line across said field, means responsive to instantaneous deviation of said other frame about said first axis and in precession-correcting relation with said one frame about said second axis, means responsive to instantaneous deviation of said one frame about said second axis and in precession-correcting relation with said other frame about said first axis, and electrical means responsive to instantaneous deviation of said other frame about said third axis, whereby the video output of said energy-responsive element may reflect self-stabilized scanning by said scanner and the output of said last-defined means may provide a means for correcting successive displays of lines of video signal developed on rotation of said scanner.

8. Optical scanning means for installation in a carrying aircraft, comprising two gimbal frames pivotally related on a first axis, means pivotally mounting one of said frames about a second axis perpendicular to said first axis, said second axis being fixedly oriented with reference to a predetermined vertical in the aircraft, whereby said second axis may be a yaw axis, said first axis being generally transverse of the aircraft, whereby said first axis may be a pitch axis, a scanner including a rotary optical member journalled in the other of said frames on a third or roll axis perpendicular to said yaw and pitch axes, said scanner having a relatively high moment of inertia about said third axis and including an energy-responsive element imaged by said optical member in a field of view, means for continuously driving said optical member about said roll axis, whereby said image is caused periodically to scan a line in said field, means responsive to instantaneous pitch deviation of said other frame and in precession-correcting relation with said one frame about said yaw axis, and means responsive to yaw deviation of said one frame and in precession-correcting relation with said other frame about said pitch axis.

9. Optical scanning means for installation in a carrying aircraft, comprising two gimbal frames pivotally related on a first axis, means pivotally mounting one of said frames about a second axis perpendicular to said first axis, said second axis being fixedly oriented with reference to a predetermined vertical in the aircraft, whereby said second axis may be a yaw axis, said first axis being generally transverse of the aircraft, whereby said first axis may be a pitch axis, a scanner including a rotary optical member journalled in the other of said frames on a third or roll axis perpendicular to said yaw and pitch axes, said scanner having a relatively high moment of inertia about said third axis and including an energy-responsive element imaged by said optical member in a field of view, means for driving said optical member about said roll axis, whereby said image is caused to scan a line in said field, means responsive to instantaneous pitch deviation of said other frame and in precession-correcting relation with said one frame about said yaw axis, means responsive to yaw deviation of said one frame and in precession-correcting relation with said other frame about said pitch axis, and display means responsive to the video-output of said energy-responsive means and including electrical means responsive to instantaneous roll deviation of said other frame and in display-correcting relation with said display means.

10. Optical scanning means for installation in a carrying aircraft, comprising two gimbal frames pivotally related on a first axis, means pivotally mounting one of said frames about a second axis perpendicular to said first axis, said second axis being fixedly oriented with reference to the aircraft, said first axis being generally transverse of the aircraft, a scanner including a rotary optical member journalled in the other of said frames on a third or roll axis perpendicular to said first and second axes and generally aligned with the flight axis of the aircraft, said scanner including an energy-responsive element fixedly carried by said other frame substantially on said roll axis, said optical element being of a focal length substantially equal to its mounting radius about said roll axis, means for continuously driving said optical member about said roll axis, whereby the image of said element is caused to scan said field laterally of the aircraft flight axis, means responsive to instantaneous pitch deviation of said other frame about said second axis and in precession-correcting relation with said one frame about said first axis, means responsive to deviation of said one frame about said first axis and in precession-correcting relation with said other frame about said second axis, and directional-reference means in precession-correcting relation with one of said frames about its pivot axis.

11. Optical scanning means for installation in a carrying aircraft, comprising two gimbal frames pivotally related on a first axis, means pivotally mounting one of said frames about a second axis perpendicular to said first axis, said second axis being fixedly oriented with reference to a predetermined vertical in the aircraft, whereby said second axis may be a yaw axis, said first axis being generally transverse of the aircraft, whereby said first axis may be a pitch axis, a scanner including a rotary optical member journalled in the other of said frames on a third or roll axis perpendicular to said yaw and pitch axes, said scanner including an energy-responsive element fixedly carried by said other frame substantially on said roll axis and imaging said element in a field of view, means for continuously driving said optical member about said roll axis, whereby the image of said element is caused to scan said field laterally of the aircraft flight axis, means responsive to instantaneous pitch deviation of said other frame and in precession-correcting relation with said one frame about said yaw axis, means responsive to yaw deviation of said one frame and in precession-correcting relation with said other frame about said pitch axis, directional-reference means in precession-correcting relation with one of said frames about its pivot axis, display means responsive to the video-output of said energy-responsive means and including sweep means synchronized with scanner rotation, and sweep-correcting means electrically responsive to instantaneous roll deviation of said other frame.

12. Optical-scanning and display means according to claim 11, in which said means in precession-correcting relation with said other frame about said pitch axis is electrical and includes an independently controlled bias, whereby said scanner may be self-stabilized with reference to a predetermined or externally controlled yaw reference.

13. Optical scanning means according to claim 11, in which said directional-reference means is a directional gyro.

14. Optical scanning means according to claim 11, in which said directional-reference means includes compass means.

15. Optical scanning means mounted on a body subject to motion about two component axes, comprising two gimbal frames pivotally related on a first of said axes, means for pivotally mounting one of said frames on the second of said axes, a scanner including a rotatable optical member journalled in the other of said frames on a third axis perpendicular to both said first and second axes, said scanner including an energy-responsive element imaged by said member in a field of view, means for continuously rotating said optical member about said third axis, whereby said image is repeatedly swept in a scan line across said field, means responsive to instantaneous deviation of said other frame about said first axis and in precession-correcting relation with said one frame about said second axis, means responsive to instantaneous deviation of said one frame about said second axis and in precession-correcting relation with said other frame about said first axis, and directional reference means independent of said scanning means and gimbal frames and in precession-correcting relation with one of said frames about its axis.

16. Optical-scanning means according to claim 15 and adapted for airborne operation, in which said last-defined means includes a compass and in which one of said first and second axes is generally a pitch axis with respect to the flight axis and the other of said first and second axes is generally a yaw axis with respect to the flight axis, said compass being in precession-correcting relation with the frame pivoted on said pitch axis.

References Cited in the file of this patent

UNITED STATES PATENTS

| | | |
|---|---|---|
| 1,876,272 | Bayer | Sept. 6, 1932 |
| 2,417,086 | Proskauer | Mar. 11, 1947 |
| 2,419,024 | Iams | Apr. 15, 1947 |
| 2,462,925 | Varian | Mar. 1, 1949 |
| 2,513,367 | Scott | July 4, 1950 |
| 2,616,077 | Holser | Oct. 28, 1952 |
| 2,648,838 | Raymond | Aug. 11, 1953 |
| 2,666,199 | Rotschild | Jan. 12, 1954 |